United States Patent [19]

Crompton

[11] 4,345,161

[45] Aug. 17, 1982

[54] MULTI-WHEEL WINDMILL ELECTRO-GENERATOR

[76] Inventor: George Crompton, 710 S. Armada Rd., Venice, Fla. 33595

[21] Appl. No.: 14,904

[22] Filed: Feb. 23, 1979

[51] Int. Cl.³ .............................................. F03D 1/02
[52] U.S. Cl. ...................................... 290/55; 290/44; 416/198 A
[58] Field of Search ....................... 290/43, 44, 54, 55, 290/40; 415/60, 65, 66; 416/198, 199, 201, 120, 128, 9-11, 200

[56] References Cited

U.S. PATENT DOCUMENTS

| | | | |
|---|---|---|---|
| 187,440 | 2/1877 | Wheeler, Jr. | 416/10 |
| 2,004,853 | 6/1935 | Crary | 416/9 |
| 2,153,523 | 4/1939 | Roberts et al. | 290/55 |
| 2,169,165 | 8/1939 | Reedy | 416/9 |
| 2,177,801 | 10/1939 | Erren | 290/55 |
| 2,388,377 | 11/1945 | Albers | 290/55 |
| 2,931,287 | 4/1960 | Inscoe | 416/9 |
| 3,187,190 | 6/1965 | Lang | 290/40 |
| 3,867,062 | 2/1975 | Troller | 416/200 A X |

Primary Examiner—J. V. Truhe
Assistant Examiner—W. E. Duncanson, Jr.
Attorney, Agent, or Firm—Cushman, Darby & Cushman

[57] ABSTRACT

Fore and aft wind wheels have oppositely inclined vanes to rotate in opposite angular directions. Each wheel drives an electric generator. The whole is mounted on a shaft to be set, by a rudder, to the azimuth of the wind.

2 Claims, 8 Drawing Figures

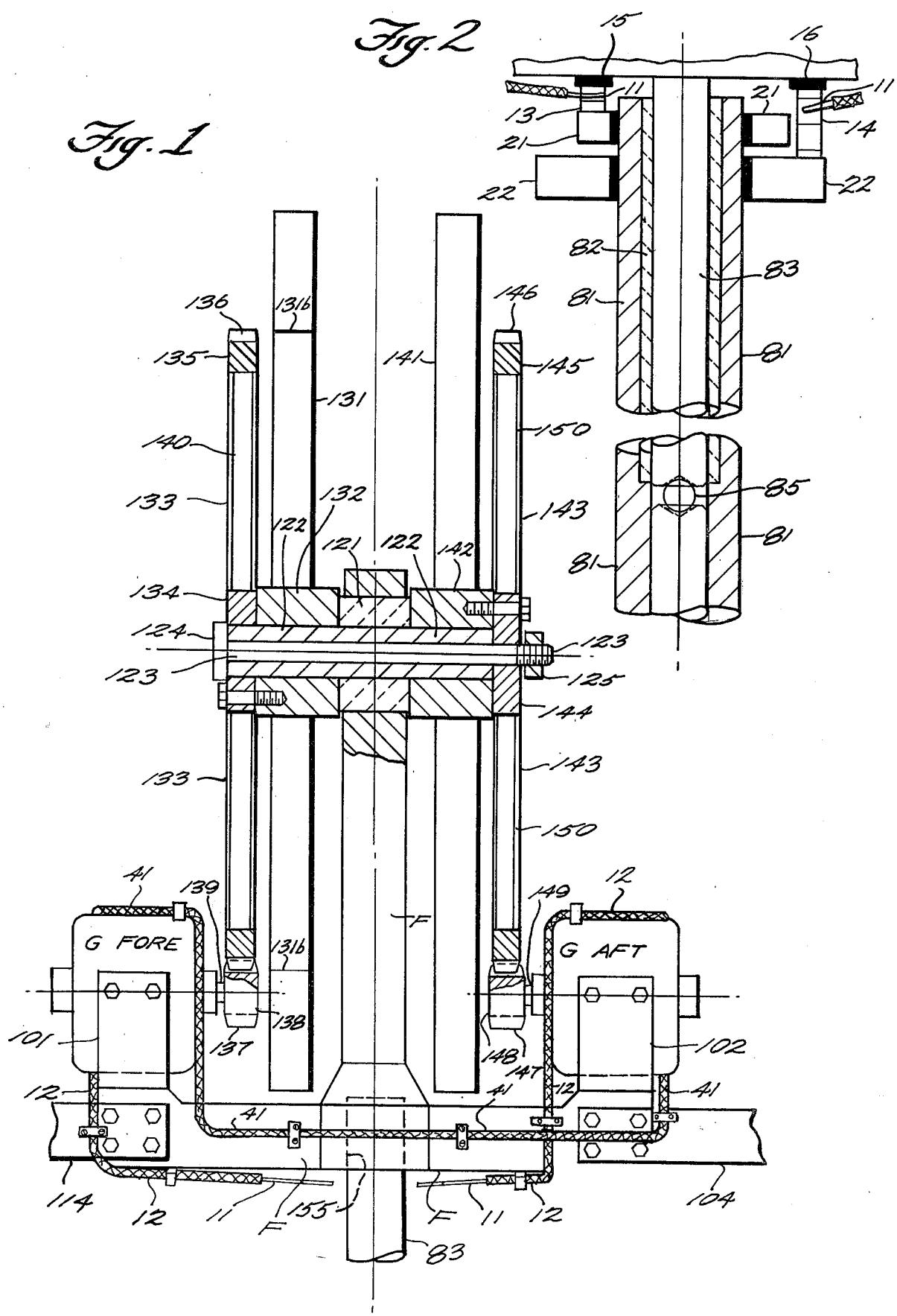

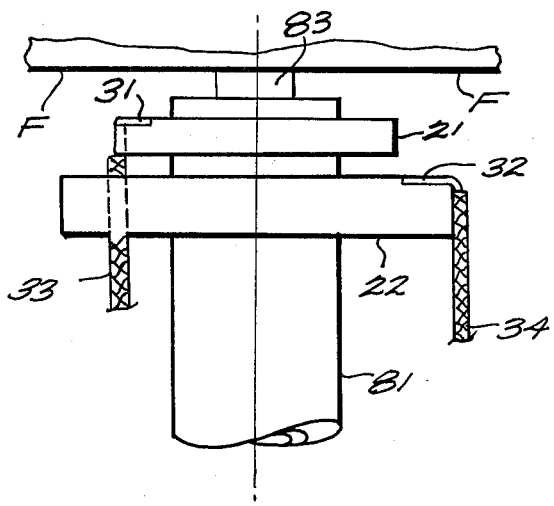
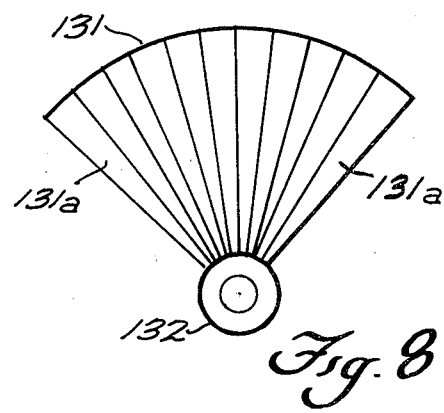
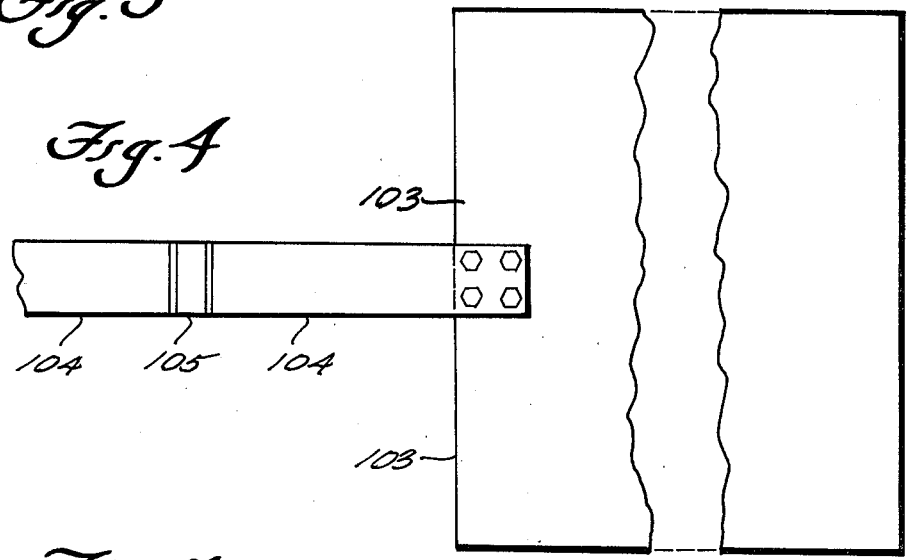
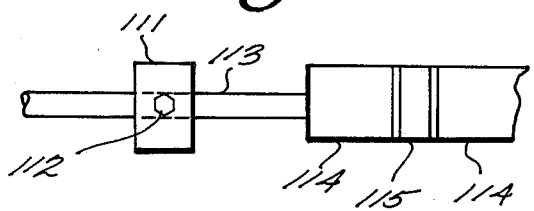
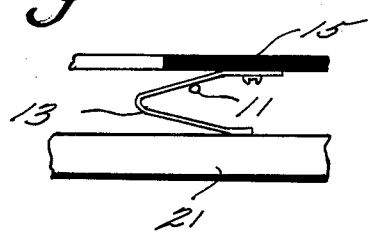
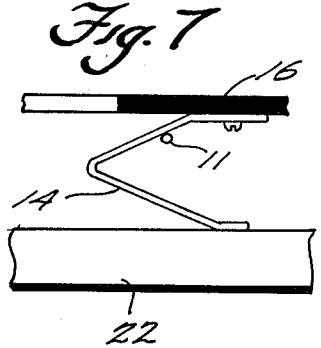

MULTI-WHEEL WINDMILL ELECTRO-GENERATOR

This invention takes energy from the wind and transforms it into electric energy. The invention uses the construction features of my prior U.S. Pat. No. 3,339,078, Wind Turbine Electro-Generators, Aug. 29, 1967, and the electric energy (watts) produced may be governed by my prior U.S. Pat. No. 3,359,479, System for Battery Charging, Dec. 19, 1967.

One object of the invention is to derive substantial power from the wind in the United States and Canada, to supplement the power we already have from hydro-turbines and steam plants both oil and coal fired, and atomic energy powered. For this purpose there can be hundreds of thousands of units scattered over the United States and Canada adding power to the grid systems already in use.

Another object of the invention is to provide a source of A.C. current, e.g. 60 Hertz, ideal for farms and houses remote from transmission lines. To convert the D.C. to A.C. at any Hertz, requires a converter, for a long time available. Typically it has one shaft, with the armature of the D.C. motor at one end, and the armature of the A.C. generator at the other end. In that way the farmer can use the electric light bulbs regularly available and also couple his electric refrigerator into the system. I add that Hertz means cycles per second, in the U.S. it is 60 standard, in Canada it used to be 25 but has been changed.

Another object of the invention is to increase the power provided by wind mills. Another object is to provide efficient wind mills which require attention only every year or so. Other objects will be in part obvious or in part pointed out hereinafter.

In the drawings some parts have the same numbers or letters as in U.S. Pat. No. 3,339,078 or in U.S. Pat. No. 3,359,479, these are followed by a hyphen and the last three digits of the patent in the specification but not on the drawings.

FIG. 1 is a view partly in vertical section and partly in elevation of the wind wheels, the supporting frame and the journal shafts and the bearings therefor and of the generators.

FIG. 2 is a vertical section of the pipe the bearing and the journal mostly taken from -078.

FIG. 3 is an elevation of the pipe 81-078 taken at 90° from FIG. 2 and showing the cable connections from the generators G-479.

FIG. 4 is an elevation of the rudder.

FIG. 5 is an elevation of the counter balance.

FIGS. 6 and 7 are elevations of brushes.

FIG. 8 is an elevation of vanes.

I provide D.C. electro-generators G-479. These are marked G Fore G Aft. These produce direct electric current to be sent to the "System for Battery Charging" of -479 which has solid state rectifiers Re-479 to prevent discharge of the batteries (Accumulator) B-479 when there is little or no wind and furthermore to prevent over charging of the batteries B-479 because -479 has a carbon pile regulator R (mismarked G) to prevent overcharging. For vagaries of the wind see my U.S. Pat. No. 3,803,910, Wind Turbulence Metering, Apr. 16, 1974.

One brush of each generator G-479 may be grounded into the generator frame, which may be grounded into the frame F which is FIG. 2, grounded into the journal shaft 83-078 which is grounded into the bronze inset bearing 82-078 which is grounded into the steel pipe 81-078 which should be embedded in concrete either out of doors or in the house containing the System for Battery Charging -479. This pipe 81-078 is electrically connected to the negative side 116-479.

The positive brushes of the generators G-479 FIG. 1 are connected by wires 11 of insulated cable 12 to spring steel brushes 13 and 14 FIGS. 6 and 7 which are connected to insulating pads 15 and 16 which are connected to the frame F. The brushes 13 and 14 contact collector rings 21 and 22. In FIG. 3 I show wires 31 and 32 soldered to the rings 21 and 22, they are insulated by cables 33 and 34 and the wires 31 and 32 are connected to the positive side 115-479. This is a parallel connection of my electro-generator to Systems -479. The object of a parallel connection is that once a sufficient electro motive force, E.M.F., is achieved, the batteries are charged about twice as fast. Now for a series connection.

One brush of generator G Fore, FIG. 1 is connected by a cable 41 (like 12 and having a wire inside) to a brush of generator G Aft and since the generator armatures are rotating in the same direction as seen from inside the brushes are in opposite positions. The other brushes are connected by wires 11, 11 to brushes 13, 14, to rings 21, 22. The wires 31 and 32 are connected to 115-479 and 116-479 so that 115-479 is made positive and 116-479 is made negative. This is a series connection. The object of a series connection is that the E.M.F. to charge the batteries B-479 is reached at about half the speed of the wind wheels.

To change from parallel to series, I may provide a switch in each generator operable by a lever outside to cut the connection to ground and put a switch in each cable 12 to cut the connection. These switches can be operated by a person on a ladder. But it is simpler to provide ordinary generators in which no brush is grounded and provide the connections described for series. Then a force 4 wind, 18–24 statute miles per hour m.p.h. of 5280 feet per mile, might be sufficient whereas day by day here in Venice, Fla. the wind never arises above force 1, 0–7 m.p.h. Thus I prefer the series connection. On the other hand in Buzzards Bay, Mass. and Rhode Island Sound, Atlantic Ocean, the wind is frequently force 4 for days at a time 18–24 m.p.h.

The frame F FIG. 1 has U shaped portions 101 and 102 to hold the generators G Fore and G Aft. The rudder 103 FIG. 4 is connected to a bar 104 which may have an offset 105 to put the median plane of the rudder 103 in the axis of the journal shaft 83-078.

A counter weight 111 FIG. 5 with a set screw 112 to adjust it to balancing position is on a rod 113 integral with a bar 114 attached to the frame F, the bar 114 having an offset 115 for the same purpose as the offset 105 but these offsets are a matter of choice.

FIG. 1 there is an upstanding central portion of the Frame F which has a bearing 121 for a hollow shaft 122 which is 077 an internal shaft 123 having a head 124 and a nut 125 secured as by a taper pin, not shown, to the shaft 123.

FIG. 1 a fore wind wheel 131 has a hub 132 that is journalled on the hollow shaft 122, a large spur gear 133 has a hub 134 that is bolted to the hub 132. The gear 133 has a ring periphery 135 with teeth 136 that mesh with teeth 137 of a pinion gear 138 on the axle shaft 139 of the generator G Fore. Spokes 140 of gear 133 may be round and few so as not to baffle or balk the wind.

An aft wind wheel 141 has a hub 142 that is journalled on the hollow shaft 122. A large spur gear 143 has a hub 144 that is bolted to the hub 142. The gear 143 has a ring periphery 145 with teeth 146 that mesh with teeth 147 of a pinion gear 148 on the axle shaft 149 of the generator G Aft. Spokes 150 of gear 143 may be round and few so as not to baffle or balk the wind. The gears are shown as plain gears but they could be herring bone or mitred.

CONSTRUCTION AND MATERIALS

FIG. 1 to connect the journal shaft 83-078 to the frame F make the bore 155 in the frame F onethousandth of an inch (one mil) less in diameter on the inch than the diameter on the inch of the shaft 83-078 and then immerse the top end of the shaft 83-078 in dry ice carbon dioxide which sublimes at $-78.5°$ C. The frame F being made of steel and the shaft 83-078 of the same, they will become integral.

I prefer titanium for the vanes of the wind wheels and cast steel for the hubs 132, 142 of the wind wheels, just set the roots of the vanes altogether into a mold of alumina, $Al_2O_3$ m.p. $2015°$ C.$\pm 15°$ C. and pour in the molten steel. Titanium melts at $1800°$ C., iron melts at $1535°$ C. (Hand book of Chemistry and Physics, 44th Ed.) and steel melts at somewhat lower temperatures than pure iron. For one way to obtain titanium metal see U.S. Pat. No. 3,098,805, July 23, 1963, to Ervin and Ueltz, written by me. Titanium has for years been used for the manufacture of air frames.

I cite two more U.S. Patents by the same inventors, Ervin and Ueltz, both also written by me, U.S. Pat. No. 2,947,672, Aug. 2, 1960 and U.S. Pat. No. 2,923,672, Feb. 2, 1960, and the three patents teach the extraction of all nine transition elements, and those which are metals are good for wind vanes since all of the metals, titanium, zirconium with its hafnium content, vanadium, niobium, tantalum, chromium and molybdenum are refractory, strong enough, non-brittle, and strongly resistant to corrosion. But certainly various bronzes and steels can be used for the vanes.

I am not showing the shapes of the vanes, but they should be curved. That is for an aerodynamic engineer. Though cast vanes may be preferred as these may be shaped to design, vanes made of sheet metal curved by pressing are less expensive and quite practical. The vanes should widen with their radius to cover as much of the area as possible.

FIG. 8, an elevation on a reduced scale shows this. The vanes 131a of the wheel 131 take up the whole circle in elevation but there is space between because of the inclination of the blades. Wheel 141 is the same but the blades are inclined oppositely. A twist is given to the column of wind by each wheel which helps the wheel aft. The wheels aft can be larger in diameter than the wheels fore to collect more wind.

I envision the first fore wheel as 50 feet in diameter. That gives an area of $3.14 \times 25 \times 25 = 1962.50$ square feet, or for 2 wheels 3925 sq. ft. and I am not limited to two. There could be four or six or an odd number. To show an aft wheel larger, I show the fore wheel 131 as smaller in diameter by lines 131b in FIG. 1.

Because of wind turbulence some air will enter between the fore and aft wheels even if they are of the same size. It will be seen that the volume outside of the body of revolution defined by the peripheries of the wind wheels is unimpeded by any enclosure so that the wind stream can enter between the wheels.

PRIOR ART

There must be scores of patents in the search room of the U.S. Patent Office describing wind mills issued in the 19th century and the early part of the 20th century. I have listed particular patents herein. Additionally the following U.S. Patents had my U.S. Pat. No. 3,339,078 cited against them:

H. J. Gregg U.S. Pat. No. 3,720,840
N. G. Wesley U.S. Pat. No. 3,740,565
R. S. Uzzell, Jr. U.S. Pat. No. 3,883,750
Baumgartner et al. U.S. Pat. No. 4,012,163
E. P. Carini U.S. Pat. No. 3,697,765

I claim:

1. A wind wheel electro-generator having a plurality of wind wheels having fixed vanes,
   said vanes balking the wind over the entire area swept by the vanes and widening with their radii,
   said wind wheels being in fore and aft relationship,
   individual electro-generators each mechanically geared to a particular wind wheel,
   said electro-generators being mechanically independent of each other, and the volume outside the body of revolution defined by the peripheries of the wind wheels being unimpeded by any enclosure so that the wind stream can enter between the wheels thereby to increase the energy received,
   one of said wind wheels being counter rotative to another thereof.

2. A wind wheel electro-generator according to claim 1, in which each aft wheel has vanes oppositely inclined from the wheel afore it and rotates oppositely.

* * * * *